United States Patent
Yamanaka et al.

[15] 3,704,415
[45] Nov. 28, 1972

[54] AUTOMATIC BALANCING MEASURING METER

[72] Inventors: Takashi Yamanaka; Rinichi Miyauchi; Hisaya Fujita; Nobuo Kaieda, all of Tokyo, Japan

[73] Assignee: Yokogawa Electric Works, Ltd., Tokyo, Japan

[22] Filed: April 2, 1970

[21] Appl. No.: 25,023

[52] U.S. Cl. .............................324/99 R, 324/117 R
[51] Int. Cl. ........................G01r 17/06, G01r 33/00
[58] Field of Search............324/99, 100, 117 R, 120; 346/31, 32; 340/186, 187

[56] References Cited

UNITED STATES PATENTS

| | | | |
|---|---|---|---|
| 2,154,260 | 4/1939 | Brandenburger | 324/99 X |
| 2,446,390 | 8/1948 | Rath | 324/99 |
| 2,586,686 | 2/1952 | Medlock | 324/99 |
| 2,347,200 | 4/1944 | Lehde | 324/99 X |
| 2,053,154 | 9/1936 | La Pierre | 324/117 R |
| 3,396,338 | 8/1968 | Buchanan et al. | 324/120 X |

Primary Examiner—Rudolph V. Rolinec
Assistant Examiner—Ernest F. Karlsen
Attorney—Chittick, Pfund, Birch, Samuels & Gauthier

[57] ABSTRACT

An automatic balancing measuring meter is comprised by a magnetic core including an input, an output and a positive feedback windings wound thereon, a movable magnet providing a magnetic flux corresponding to the angle of rotation thereof, an amplifier including a tuning circuit connected to the output winding, a feedback circuit to apply a portion of the output from the amplifier to the positive feedback winding, a detector to detect the output from the amplifier, and torque generating means energized by the detector to drive the movable magnet to cause the flux produced by the movable magnet to balance with the flux produced by the input winding.

4 Claims, 7 Drawing Figures

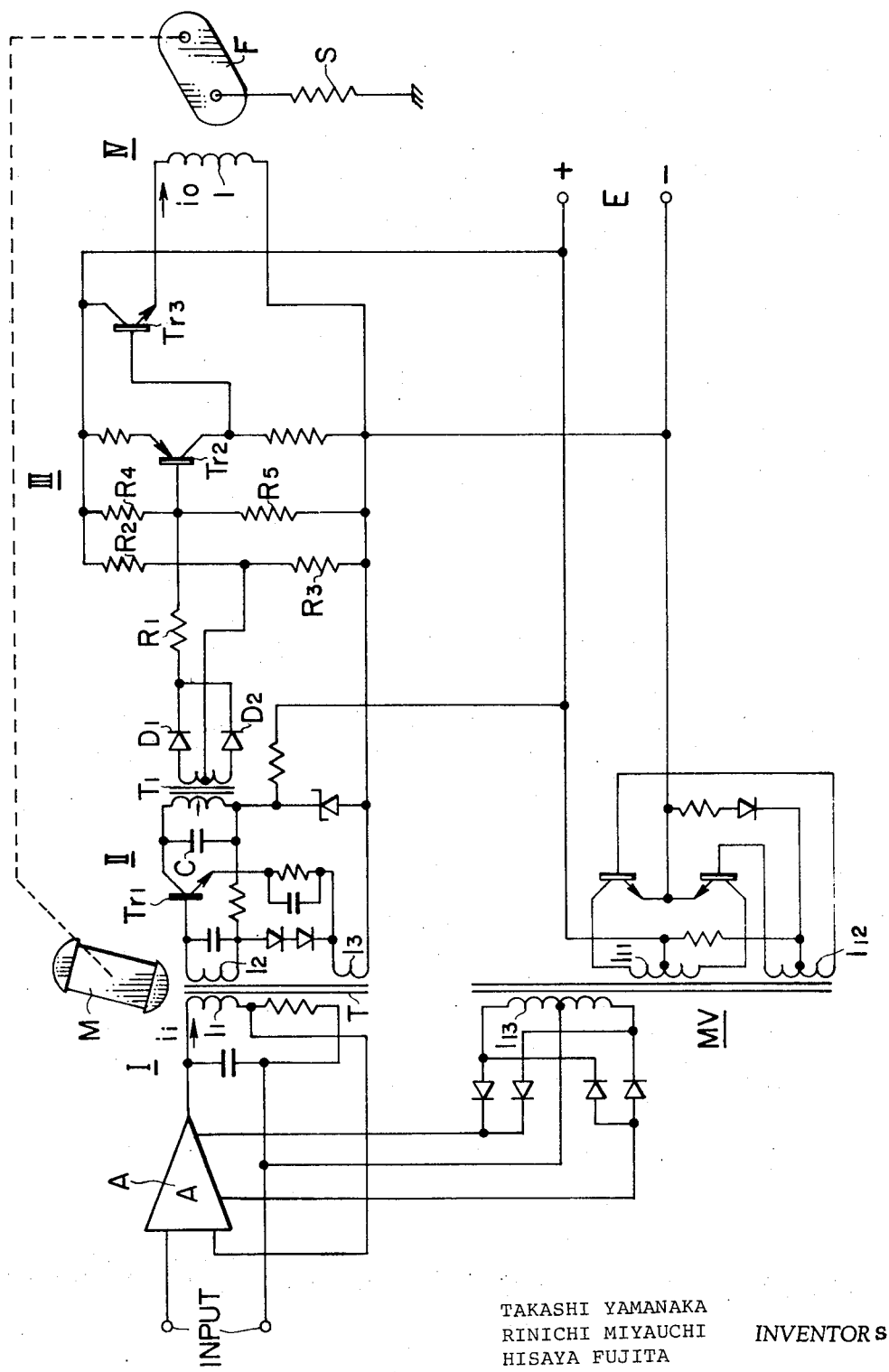

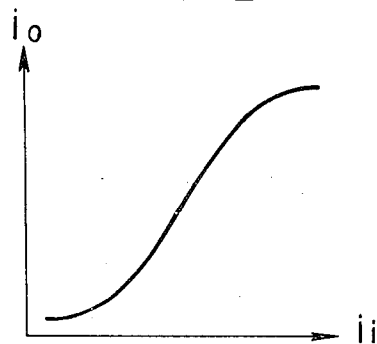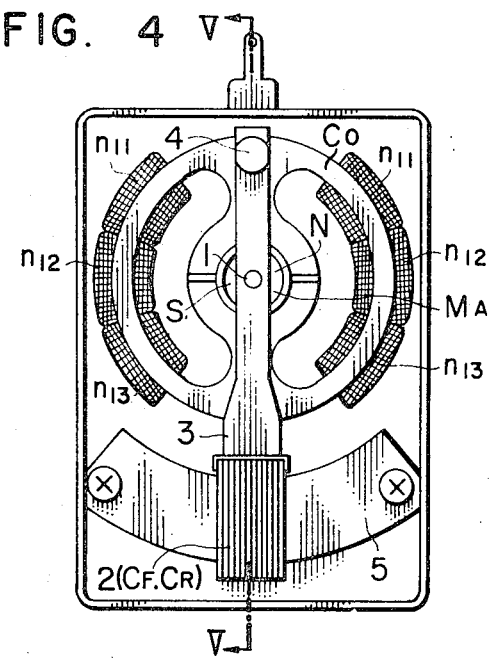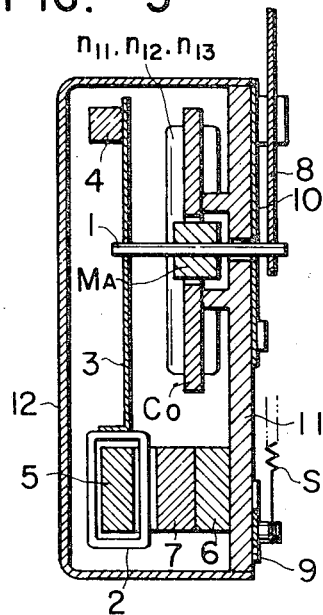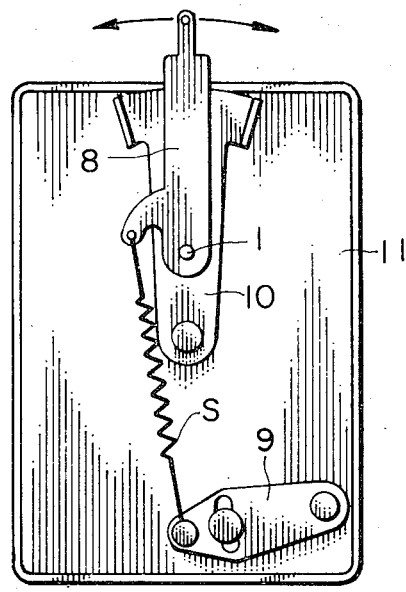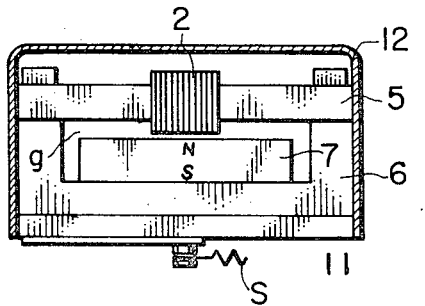

AUTOMATIC BALANCING MEASURING METER

BACKGROUND OF THE INVENTION

This invention relates to an automatic balancing measuring instrument and more particularly to an automatic balancing measuring instrument wherein a magnetic standard including an input winding and a moving magnet is utilized and wherein the magnetic flux produced by the input winding is automatically balanced against the magnetic flux produced by the moving magnet to indicate or record a DC signal applied to the input winding.

An automatic balancing measuring instrument which balances magnetic fluxes produced by a moving magnet and an input winding, respectively is disclosed in U.S. Pat. No. 2,053,145 or Japanese Pat. No. 127,165.

SUMMARY OF THE INVENTION

It is an object of this invention to improve this well known type of automatic balancing measuring instrument.

Another object of this invention is to provide a servometer of simple construction and high gains which does not require an independent AC source or an oscillator and the like.

The automatic balancing measuring apparatus constructed according to the principal of this invention comprises a magnetic core, an input winding, an output winding and a positive feedback winding which are wound on said core, a movable magnet providing a magnetic flux for said core of the value corresponding to the angle of rotation of said movable magnet, an amplifier including a tuning circuit connected to said output winding, a feedback circuit to apply a half wave rectified portion of the output from said amplifier to said positive feedback winding, a detector circuit to detect the output from said amplifier, and torque generating means connected to the output from said detector circuit to drive said movable magnet to cause said flux in said core provided by said magnetic core to balance with the flux produced by said input winding.

In accordance with another aspect of this invention there is provided an automatic balancing apparatus comprising a magnetic standard including a magnetic core provided with an input winding, an output winding and a positive feedback winding, and a movable magnet providing for said magnetic core a flux of a value corresponding to the angle of rotation of said movable magnet; a self-oscillation amplifier including an amplifier to amplify the output from said output winding of said magnetic standard, and a circuit to positively feedback the output from said amplifier to said positive feedback winding; a rectifier to rectify the output from said self-oscillation circuit; and a forcing coil supplied with the rectified output from said rectifier to mechanically drive said movable magnet until a balanced position is reached where said flux provided by said movable magnet and the flux provided by said input winding balance each other.

Preferably a rate coil is associated with the forcing coil to detect the rate of change in the moving speed of the forcing coil to provide a braking force thereto.

BRIEF DESCRIPTION OF THE DRAWING

The invention can be more fully understood from the following detailed description taken in conjunction with the accompanying drawings in which:

FIG. 1 shows a connection diagram of one embodiment of the novel automatically balanced measuring instrument;

FIG. 2 shows a characteristic curve of a servo-amplifier utilized in this invention;

FIG. 4 is a plan view of an assembly of a magnetic standard, a forcing coil and a rate coil;

FIG. 5 is a sectional view of the assembly taken along a line V — V in FIG. 4;

FIG. 6 shows a side elevation and

FIG. 7 shows the rear view of the assembly shown in FIG. 4.

DESCRIPTION OF THE PREFERRED EMBODIMENTS

Figure 3:
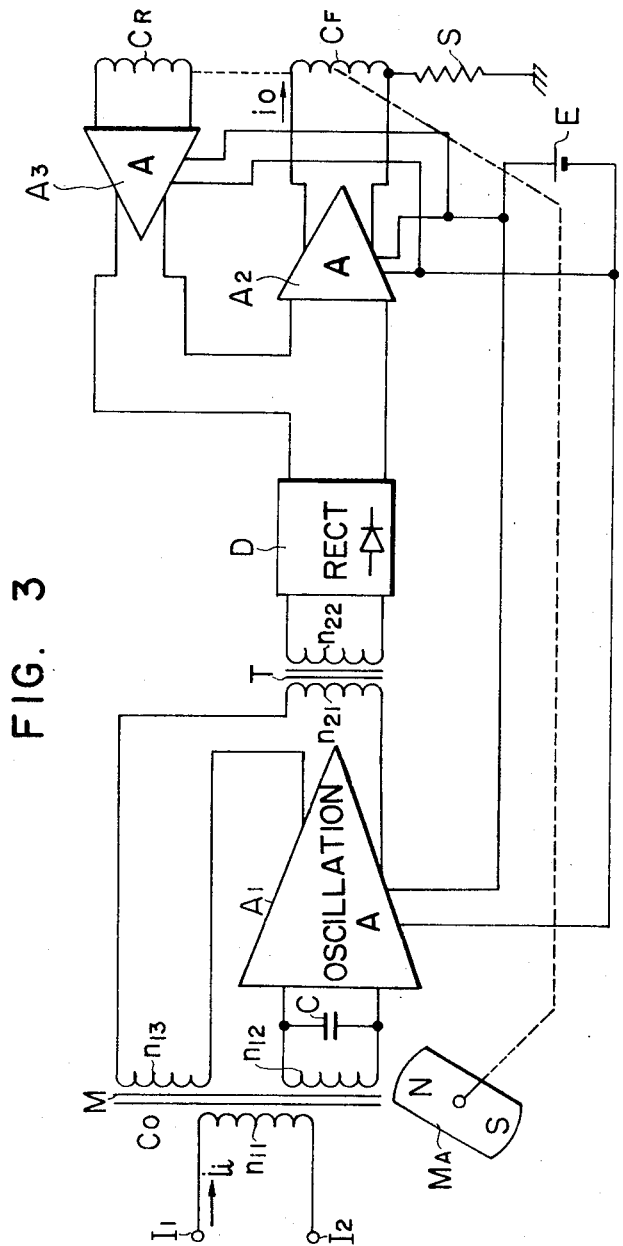
FIG. 3 is a connection diagram of a modified embodiment of this invention.

Referring now to the accompanying drawing a preferred embodiment of the novel automatic balancing measuring instrument illustrated in FIG. 1 comprises an amplifier A connected to receive a DC input signal through input terminals INPUT and a magnetic standard I including a magnetic core T, a movable magnet M and a DC input winding $1_1$, an output winding $1_2$ and a positive feedback winding $1_3$ which are wound upon the magnetic core T. The measuring instrument further comprises an amplifier circuit II including a tuning circuit which includes an amplifier transistor $Tr_1$, an output transformer $T_1$ and an output condenser C which cooperates with the input winding of transformer $T_1$ to constitute the tuning circuit, and a detector amplifier III including detector diodes $D_1$ and $D_2$, resistors $R_1$, $R_2$ and $R_3$, bias resistors $R_4$ and $R_5$ and amplifier transistors $Tr_2$ and $Tr_3$. Further, a torque motor IV is provided comprising an exciting winding 1, a moving core or a rotor F and a balancing spring S connected to the rotor F. DC power is supplied to the measuring instrument from a DC source E, and a multivibrator MV is provided to convert the output of the source E into an alternating current which is supplied to the amplifier A through an input winding $1_{11}$ and an output winding $1_{13}$.

Thus, the input terminals INPUT for the DC voltage are connected to the input winding $1_1$ of the transformer T of the magnetic standard I via the DC amplifier A. Output winding $1_2$ of transformer T is coupled to the input of the tuning amplifier circuit II and the output thereof is connected to the input of the detector amplifier III and to the positive feedback winding $1_3$ of transformer T. The output of the detector amplifier III is connected to the exciting winding 1 of the torque motor IV. As shown by dotted lines the moving magnet M of the magnetic standard I is driven by the rotor F of the torque motor IV.

The novel automatic balancing measuring instrument operates as follows:

Upon application of the half wave rectified voltage from the tuning amplifier II to the feedback winding $1_3$ of the transformer T of the magnetic standard I, an AC voltage will be produced in output winding $1_2$ of transformer T having a magnitude corresponding to the difference flux $\Delta\phi$ between the magnetic flux produced by the current supplied to the input winding $1_1$ of transformer T in accordance with the DC voltage impressed upon input terminals INPUT and the magnetic flux supplied to the core of transformer T from the movable magnet M. The magnitude of said AC output voltage is proportioned to the difference flux $\Delta\phi$ and the phase of the AC voltage is reversed in accordance with the polarity of the difference flux $\Delta\phi$. The transformer T is thus here operating as a saturable reactor. Thus, the AC signal supplied by the output winding $1_2$ and the signal applied to the positive feedback winding $1_3$ have the same frequency. The AC output signal from the output winding $1_2$ of the transformer T is amplified by the tuning amplifier II and the rectified half wave obtained from a portion of the amplified signal is applied to the positive feedback winding $1_3$. Thus, the tuned amplifier II comprises a portion of a feedback oscillator in cooperation with transformer T whereby to increase the oscillation output and hence the output voltage in proportion to a signal corresponding to a given polarity of the difference flux $\Delta\phi$. However, as the polarity of this difference flux is reversed. The oscillation is stopped. The oscillation output of the tuning amplifier II is detected by diodes $D_1$ and $D_2$ of the detector amplifier III and is then amplified by transistors $Tr_2$ and $Tr_3$ to provide an output signal containing ripples. The output from the detector amplifier III is supplied to the exciting coil 1 of the torque motor IV. However, as the frequency of the ripples contained in the output is high, the torque motor responds only to the DC component.

FIG. 2 shows the relationship between the DC current $i_i$ supplied to the input winding $1_1$ of the magnetic standard I and the output DC current $i_0$ supplied to the exciting winding 1 of the torque motor IV. As can be noted from FIG. 2 as the input current $i_i$ increases, the output DC current $i_0$ also increases correspondingly to increase the torque of the rotor F of the torque motor IV. Increase in the torque of the rotor F results in a rotary movement of the movable magnet M of the magnetic standard I until a balancing position is reached at which the flux produced by DC current $i_i$ supplied to the input winding $1_1$ and the flux supplied to the core of transformer T from the moving magnet M balance each other. Conversely decrease in the input DC current causes decrease in the output current $i_0$ whereby the rotor M is rotated in the opposite direction by the force of spring S until a new balancing position is reached where the flux produced by the input current $i_i$ and the flux supplied by the moving magnet M again balance each other. In this manner, it is possible to display the displacement corresponding to the input DC signal in terms of the position of the rotor F of the torque motor or the position of the movable magnet M of the magnetic standard.

In the modified embodiment shown in FIG. 3 the DC input signal $i_i$ is supplied across input terminals $I_1$ and $I_2$. In this embodiment, the magnetic standard M is shown as comprising a saturatable magnetic core $C_0$, a movable magnet $M_A$ disposed in an air gap of the core $C_0$ to produce a magnetic flux in the core of the magnitude proportional to the angle of rotation of the magnet, and an input winding $n_{11}$, an output winding $n_{12}$ and a positive feedback winding $n_{13}$. The output winding $n_{12}$ is shunted by a tuning condenser C and is connected to an oscillation amplifier $A_1$. A transformer T is provided having an input winding $n_{21}$ energized by the output from the oscillation amplifier $A_1$ through feedback winding $n_{13}$ and an output winding $n_{22}$ connected to a rectifier D. The output of the rectifier D is supplied to a forcing coil $C_F$ rotatable in a uniform unidirectional field and a rate coil $C_R$ cooperating with the forcing coil, respectively, through amplifiers $A_2$ and $A_3$. The forcing coil $C_F$ is normally biased by a constant force supplied by a spring S. The output of the rate coil $C_R$ is negatively fed back to the input of the amplifier $A_2$ through the amplifier $A_3$. A source of direct current E provides necessary power to amplifiers $A_1$, $A_2$ and $A_3$.

The modified embodiment shown in FIG. 3 operates as follows. More particularly, the magnetic standard M is constructed such that the flux $Y_1$ produced in the core $C_0$ by the input DC current $i_i$ and the flux $\phi_2$ produced in the core $C_0$ by the movable magnet $M_A$ have opposite directions, and that if fluxes $\phi_1$ and $\phi_2$ are not equal and hence to produce a difference flux $\Delta\phi$ the output winding $n_{12}$ provides an output voltage of the magnitude corresponding to the difference flux $\Delta\phi$. The output voltage from the output winding $n_{12}$ is amplified by the amplifier $A_1$ and the amplified output is supplied to the input winding $n_{21}$ of transformer T via the positive feedback winding $n_{13}$. As a result, the circuit comprising the output winding $n_{12}$, amplifier $A_1$ and the positive feedback winding $n_{13}$ of the magnetic standard M performs a self-oscillation, the oscillation frequency thereof being determined by the inductance of the output winding $n_{12}$ and the capacitance of the tuning condenser C. While the amplitude of the output of the self-oscillation circuit increases corresponding to the magnitude of the difference flux $\Delta\phi$, when the polarity of the difference flux $\Delta\phi$ reverses the oscillation stops. The output from the self-oscillation circuit is rectified by the rectifier D and is then amplified by the amplifier $A_2$. The amplified DC output $i_0$ is supplied to the forcing coil $C_F$. If the torque produced by the DC output $i_0$ exceeds the force of spring S, the forcing coil is rotated by a torque proportional to the difference. Rotation of forcing coil $C_F$ causes movable magnet $M_A$ to rotate until a balanced position is reached where the flux $\phi_1$ produced by the input DC current $i_i$ and the flux $\phi_2$ produced by the moving magnet $M_A$ balance with each other. Conversely as the input DC current $i_i$ is decreased to decrease the output DC current $i_0$ to decrease the torque produced by the forcing coil $C_F$ to a value less than the force of spring S, the forcing coil $C_F$ (and hence the movable magnet $M_A$) is rotated in the opposite direction in proportion to the difference between its torque and the force of spring S until a new balanced position is reached at which the flux $\phi_1$ produced by the input DC current $i_i$ and the flux $\phi_2$ produced by the moving magnet M again balance each other. Thus, according to this invention, it is possible to display the displacement which varies in accordance with the magnitude of the input DC current $i_i$ in terms of the position of the forcing coil $C_F$ or of the moving magnet $M_A$. Furthermore the rate coil $C_R$ cooperating with the forcing coil $C_F$ produces a voltage proportional to the speed of rotation of the forcing coil $C_F$ to negatively feedback this voltage to the input of amplifier $A_2$, thus applying an appropriate braking force to the rotary movement of the forcing coil $C_F$ with simple construction.

FIGS. 4 to 7 inclusive show a preferred construction of an assembly of the magnetic standard, the forcing coil and the rate coil. FIG. 4 shows a plan view of the assembly, FIG. 5 is a sectional view of the assembly taken along a line V — V in FIG. 4, FIG. 6 shows a side elevation and FIG. 7 shows a rear view of the assembly. In FIGS. 4 to 7, elements corresponding to those dipicted in FIG. 3 are designated by the same reference numerals. The assembly comprises a rotary shaft, a movable coil 2 including the forcing coil $C_F$ and the rate coil $C_R$ which are wound on the same frame secured to the shaft 1 by means of a supporting disc 3, a weight 4 attached to the supporting disc 3 to balance the weight of movable coil 2, a magnetic core 5 linking the movable coil 2, a U shaped yoke 6 interconnecting the opposite ends of the core 5 and a permanent magnet 7 lying along the yoke 6. When energized by the input DC $i_0$ (FIG. 1), the movable coil 2 rotates to the right or left as viewed in FIG. 4 about shaft 1 in an air gap defined between core 5 and magnet 7 to rotate therewith the movable magnet $M_A$ of the magnetic standard M secured to the shaft 1. An output arm 8 is secured to the opposite end of shaft 1 and is connected to one end of a spring S, the opposite end thereof being connected to an adjusting lever 9. A stop 10 is secured to a base plate 11 of the assembly to limit excessive movements of the output arm 8. With this assembly it is possible to display the rotational displacement of the movable coil 2 or movable magnet $M_A$ in terms of the displacement of the output arm 8. Consequently, it is possible to record or indicate the value of the input current $i_i$ by connecting the outer end of the output arm 8 with a suitable recording mechanism or an indicating mechanism, not shown.

Thus, the novel automatic balancing measuring instrument can operate at high accuracies because it utilizes a movable permanent magnet as the magnetic standard. Morecover since the signal detection circuit of the magnetic standard includes an oscillator and an amplifier, it is not necessary to provide an independent AC source and oscillator, thus greatly simplifying the circuit construction.

Although the output signal from the above described oscillation amplifier acting as an amplifier and an oscillator has only one polarity, when combined with a movable core type torque motor or a movable coil type torque motor provided with a balancing spring as shown in FIG. 1 or 3, the oscillation amplifier constitutes an automatic balancing type measuring instrument which is simple and inexpensive. Moreover, the novel measuring instrument can operate with a DC source alone without the necessity of providing an AC source for excitation as in the prior art apparatus. Further, since the input terminals are isolated from the source, the novel instrument is suitable for use in many industrial applications. Mounting of the forcing coil and the moving magnet of the magnetic standard on the common rotary shaft greatly simplifies the construction, thus providing a balancing apparatus of small size and compact construction. Further, by mounting the rate coil on the same frame as the forcing coil to utilize the output of rate coil as the braking force, the braking characteristics of the automatic balancing measuring instrument can be improved.

While the invention has been shown and described in terms of preferred embodiment thereof, the invention is not limited to these embodiments and many changes and modifications will be obvious to one skilled in the art without departing from the true spirit and scope of the invention as defined in the appended claims.

What is claimed is:

1. An automatic balancing measuring instrument comprising a saturable magnetic core, an input winding, an output winding and a positive feedback winding which are wound on said core, a movable magnet providing a magnetic flux for said core of the value corresponding to the angle of rotation of said movable magnet, an amplifier including a tuning circuit connected to said output winding, a feedback circuit including a half wave rectifier to apply a portion of the output from said amplifier to said positive feedback winding, a detector circuit to detect the output from said amplifier, and torque generating means connected to the output from said detector circuit to drive said movable magnet to cause said flux in said core provided by said movable magnet to balance with the flux produced by said input winding.

2. An automatic balancing apparatus comprising a magnetic standard including a saturable magnetic core provided with an input winding, an output winding and a positive feedback winding, and a movable magnet providing for said magnetic core a flux of a value corresponding to the angle of rotation of said movable magnet; a self-oscillation amplifier including an amplifier to amplify the output from said output winding of said magnetic standard, and a circuit to positively feedback the output from said amplifier to said positive feedback winding; a rectifier to rectify the output from said self-oscillation circuit; and a forcing coil supplied with the rectified output from said rectifier to mechanical drive said movable magnet until a balanced position is reached where said flux provided by said movable magnet and the flux provided by said input winding balance each other.

3. The automatic balancing apparatus according to claim 2 wherein said movable magnet and said forcing coil are mounted on the same rotary shaft.

4. An automatic balancing apparatus comprising a magnetic standard including a saturable magnetic core provided with an input winding, an output winding and a positive feedback winding, and a movable magnet providing for said magnetic core a flux of a value corresponding to the angle of rotation of said movable magnet; a self-oscillating circuit including a first amplifier to amplify the output from said output winding of said magnetic standard, and a circuit for positively feeding back the output from said first amplifier to said positive feedback winding; a rectifier to rectify the output from said self-oscillation circuit; a second amplifier to amplify the output from said rectifier; a forcing coil responsive to the output from said second amplifier to drive said movable magnet until a balanced position is reached where said flux provided by said movable magnet and the flux provided by said input winding balance each other; a rate coil wound on the same frame as said forcing coil; and means to negatively feedback the output from said rate coil to the input of said second amplifier.

* * * * *